United States Patent [19]

Doe et al.

[11] 4,088,230

[45] May 9, 1978

[54] CONTROL MEANS FOR A BAR HOLDER AND FEEDER COUPLED TO AN AUTOMATIC MACHINE TOOL

[75] Inventors: Ewart H. Doe, Houghton; William J. Linforth, Chandlers Ford, both of England

[73] Assignee: Twyford Moors (Aircraft & Engineering) Ltd., England

[21] Appl. No.: 600,122

[22] Filed: Jul. 29, 1975

[30] Foreign Application Priority Data

Aug. 19, 1974 United Kingdom ............... 36397/74

[51] Int. Cl.² ............................................ B23Q 5/22
[52] U.S. Cl. .................................... 214/1.2; 82/2.7
[58] Field of Search ................... 214/1.1, 1.2, 1.3, 1.4, 214/1 P, 2.5, 1.5; 294/86.12, 90, 91, 106; 269/126, 237, 57, 107, 153, 157, 218, 238, 239; 82/2.5, 2.7

[56] References Cited

U.S. PATENT DOCUMENTS

| 1,174,361 | 3/1916 | Simmons et al. | 294/90 |
|---|---|---|---|
| 1,295,439 | 2/1919 | Coveney | 294/90 |
| 3,328,052 | 6/1967 | Nilsson | 269/237 X |
| 3,802,689 | 4/1974 | Doe | 269/57 |
| 3,941,256 | 3/1976 | Doe et al. | 214/1.4 |

FOREIGN PATENT DOCUMENTS

| 11,600 of | 1892 | United Kingdom | 214/1.1 |
|---|---|---|---|
| 973,065 | 10/1964 | United Kingdom | 294/86.12 |

*Primary Examiner*—Evon C. Blunk
*Assistant Examiner*—Joseph E. Valenza
*Attorney, Agent, or Firm*—Lowe, King, Price & Markva

[57] ABSTRACT

Control means for a bar holder and feeder coupled to an automatic machine tool to hold bars for and feed bars to the machine tool and having feed means to feed a bar from the bar holder through a collet of the machine tool, the control means comprising counting means settable to a determined number; trip means operable when in a set position to trip the counting means once for each work piece machined; trigger means effective to move said trip means to the set position when a new length of bar is fed into the bar holder; and coupling means coupling the counting means to means controlling machining operation of the machine tool; said determined number being settable so that, after a number of workpieces equal to said determined number have been machined from a length of bar preceding said new length of bar, such that the remnant of said length of bar is not of sufficient length safely to permit machining of a further workpiece therefrom, the counting means cause the coupling means to stop the machine tool and cause the feed means to eject said remnant from the collet of the machine tool, by feeding the forward end of said new length of bar through the collet.

Preferably a dead stop of the machine is movable laterally by an air ram to allow the feed means to feed the remnant of an old bar therebeyond and is restored to its old position when the feed means have moved forward one workpiece length to stop the new bar in the correct position for machining.

8 Claims, 10 Drawing Figures

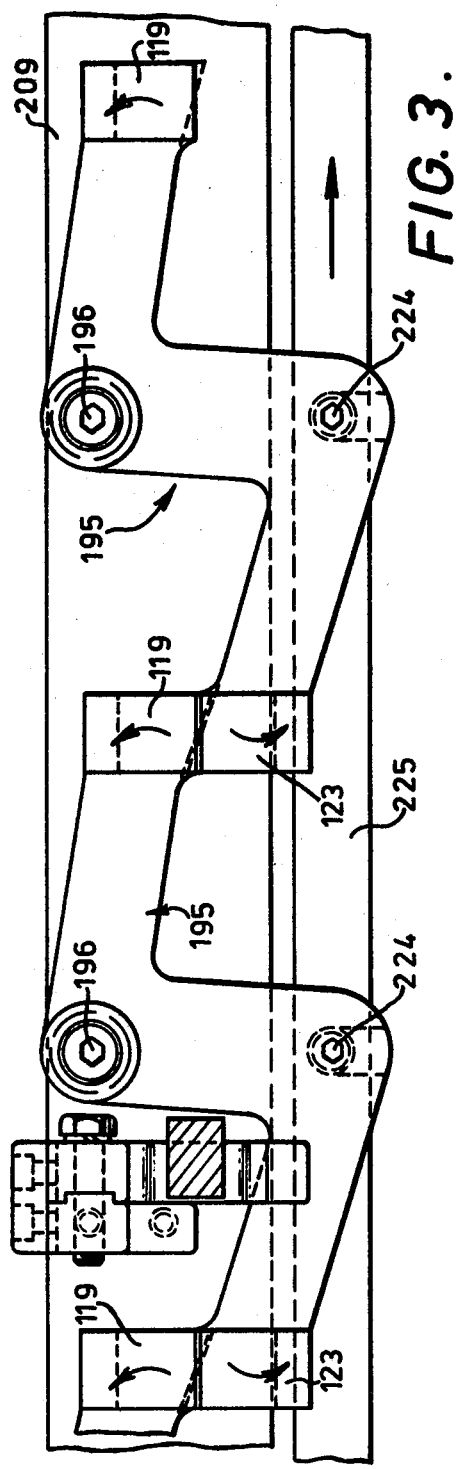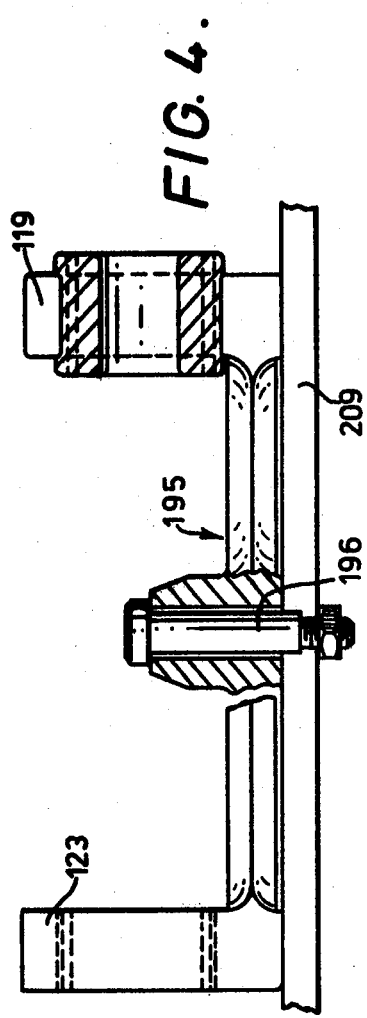

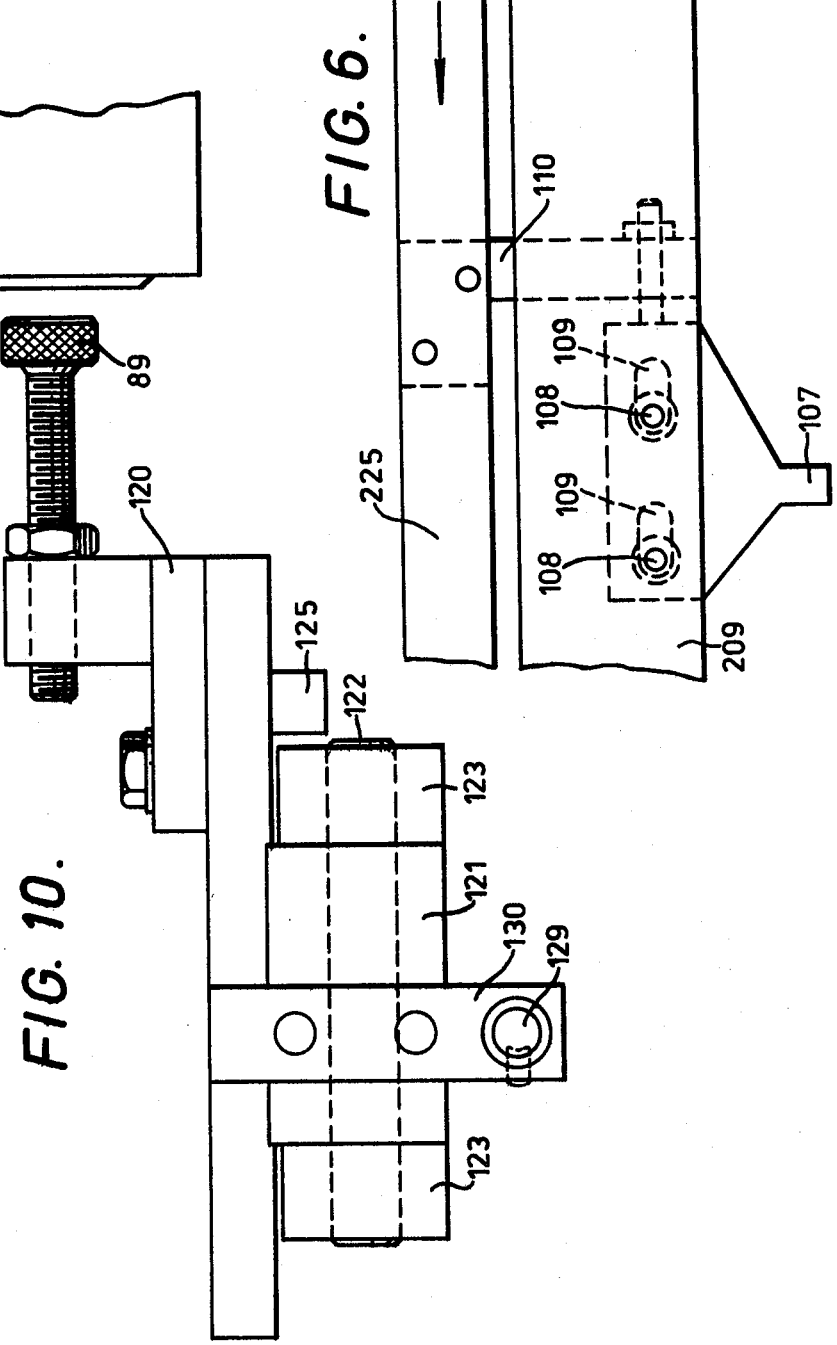

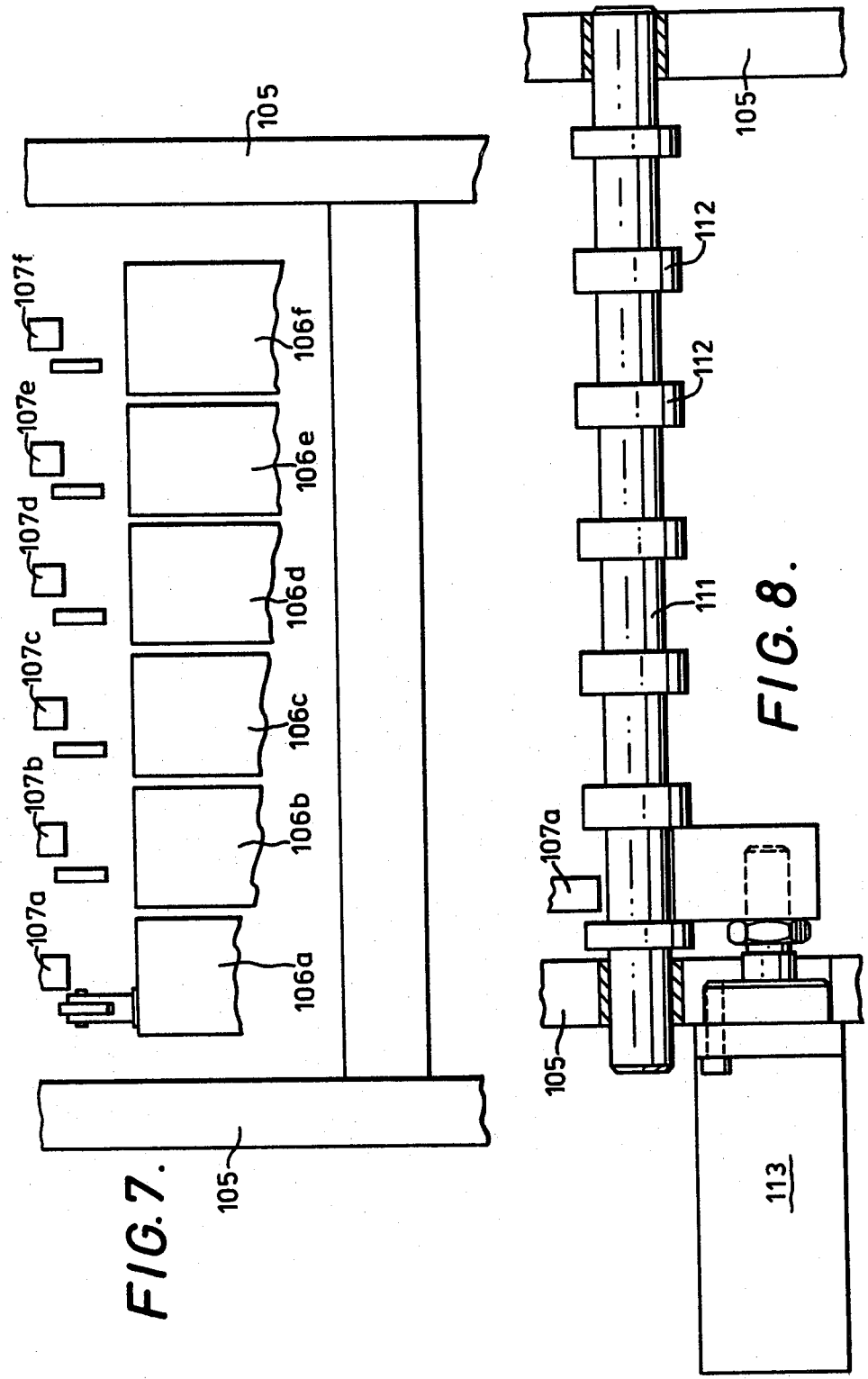

CONTROL MEANS FOR A BAR HOLDER AND FEEDER COUPLED TO AN AUTOMATIC MACHINE TOOL

BACKGROUND OF THE INVENTION

The invention relates to control means for a bar feeder and holder coupled to a machine tool to hold bars for and feed bars to the machine tool and particularly to control means for a bar feeder and holder of the kind disclosed in our U.S.A. application Ser. No. 487,953 now U.S. Pat. No. 3,941,256, issued Mar. 2, 1976.

When feeding automatic machine tools with bar by means of a bar feeder, the problem arises that when a bar being machined is almost used up, a condition which must be avoided can arise wherein a remnant formed by the extreme tail-end of a bar is gripped only in the front end of the jaws of a collet and a length of the bar to form the workpiece projects from the collet into the machining space of a machine tool. If machining operations are attempted on a remnant of bar held in this way, the reaction of the remnant of bar to the cutting tool is likely to move the free end of the remnant away from the axis of rotation of the bar to cause it to sweep round in a circle, with consequent damage to the cutting tool and the jaws of the collet. To avoid the possibility of such a condition arising, it is normal practice to feed out of the collet and against a dead-stop a greater length of bar than is required to form a workpiece and then to traverse the dead-stop towards the collet before the collet is closed. Thus, it is ensured that there is always sufficient length of bar for safe machining, since if there is not sufficient bar the remnant of the bar will fall out of the collet before the movement of the dead-stop towards the collet begins. The disadvantage of this method is, however, that an unduy long time is required for each bar feed operation, the length of workpiece that can be machined is unduly restricted and an amount of space is required to permit the movement of the dead-stop such that there may not always be sufficient space to mount the maximum number of cutting tools which could otherwise be provided.

SUMMARY OF THE INVENTION

According to the invention there is provided control means for a bar holder and feeder coupled to an automatic machine tool to hold bars for and feed bars to the machine tool, of the kind set forth in our aforesaid U.S. Patent and having feed means to feed a bar from the bar holder through a collet of the machine tool. The control means comprise counting means settable to a determined number; trip means operable when in a set position to trip the counting means once for each work piece machined; trigger means effective to move said trip means to the set position when a new length of bar is fed into the bar holder; and coupling means coupling the counting means to means controlling machining operation of the machine tool; said determined number being settable so that, after a number of workpieces equal to said determined number have been machined from a length of bar preceding said new length of bar, such that the remnant of said length of bar is not of sufficient length safely to permit machining of a further workpiece therefrom, the counting means cause the coupling means to stop the machine tool and cause the feed means to eject said remnant from the collet of the machine tool, by feeding the forward end of the said new length of bar through collet.

Thus, said determined number should be set to be equal to the number of whole workpiece lengths obtainable from a length of bar equal to the distance between the position of the rear end of the old bar when the new length of bar is loaded into an elongate bar holder of the bar holder and feeder and the position of the rear end of the jaws of the collet of the machine tool, such that when that number of workpieces have been machined from the length of bar, the rear end of the old bar lies within one workpiece length of the rear end of the jaws of the collet.

Preferably the trigger means comprise a member which is moved by opening movement of the bar holder to allow a new bar to be loaded thereinto and which, when so moved, abuts the trip means to move it into the set position. Air ram powered cancelling means are preferably provided to move the trip means out of the set position upon ejection of said remnant from the bar holder.

The counting means preferably comprises an electro magnetic counter coupled to an electrical actuating switch, the trip means tripping the actuating switch to cause the counter to count.

Preferably, means are provided to move the dead-stop of the machine tool laterally out of its operating position when the remnant of an old bar is ejected from the collet.

Said means to move preferably comprise a pivot mounting for the dead stop with a pivot axis extending substantially parallel to the direction of bar feed and an air ram energizable to pivot the dead stop about the pivot axis laterally out of its operating position, a spring being provided biasing the dead stop for movement about the pivot axis of its operating position. A limit switch is preferably provided on the feed means effective to de-energize the air ram when the feed means have moved forwardly by an amount equal to the workpiece length thereby to allow the spring to restore the dead-stop to its operating position to stop the front end of the new bar in the correct position for machining.

In this Specification the term "workpiece length" is to be understood to indicate the length of bar necessary to form a workpiece, that is to say, not just the length of the actual workpiece which is produced but in addition the length of bar used up due to the width of the parting-off tool.

The control means of the invention permits the time necessary for each forward feed of bar to form a workpiece to be considerably reduced, since there is no requirement for feedback of the dead-stop, whereby the forward feed of bar can generally be effected in the standard collet open time for that particular machine tool. The forward feed of the remnant of the bar to be ejected from the collet is relatively slow, but since a large number of workpieces are normally cut from each bar this is not a great disadvantage.

The control means of the invention allows bars of any length exceeding said distance to be loaded into the bar holder and machined in the machine tool without risk of damage to the collets or cutting tools caused by the collet having an insufficient length of bar to obtain a grip thereupon.

The machine tool is preferably an automatic multi-spindle machine tool and the bar feeder and holder has a plurality of elongate bar holders, one aligned with each spindle on the machine tool, and respective counting means, trip means and trigger means are provided for each elongated bar holder.

BRIEF DESCRIPTION OF DRAWINGS

The invention is illustrated by way of example in the accompanying drawings, in which diagrammatically:

FIG. 3 is a plan view of part of one elongate bar holder of the bar holder and feeder of FIG. 1, FIG. 4 is a part sectional elevation corresponding to FIG. 3, FIGS. 6, 7 and 8 are views taken respectively in the directions of arrows VI, VII and VIII of FIG. 5, FIG. 10 is a view taken in the direction of arrow X of FIG. 9

DESCRIPTION OF SPECIFIC EMBODIMENTS

Figure 1:
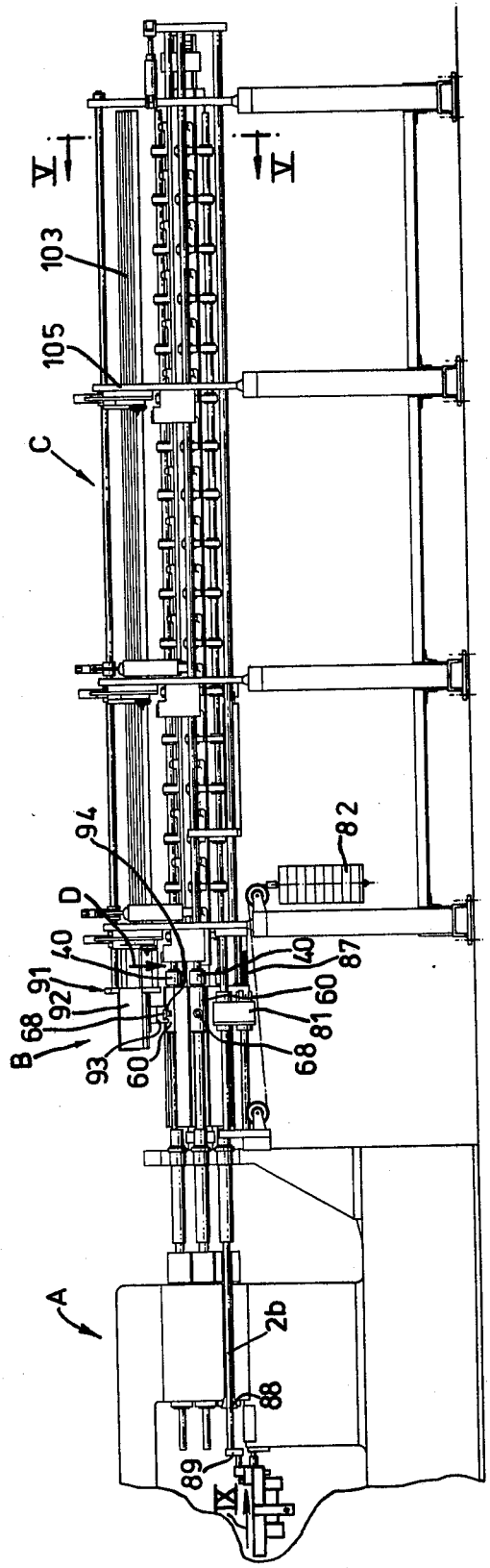
FIG. 1 is a side view of the rear end of a multi-spindle automatic lathe co-operating with a bar holder and feeder which can feed bars to be machined through the collets of the spindles of the lathe.

Referring to the drawings and firstly to FIG. 1, a six spindle lathe A has its spindle head coupled by means (not shown) to a bar feeder generally indicated at B and having six individual feeders corresponding to the spindles of the machine tool. The bar feeder B is coupled to a bar holder C comprising six elongate bar holders which can be loaded with bar to be machined from a magazine 103 which stores a plurality of bars. The bar holder C is indexed around, together with the bar feeder B, as the spindle head of the machine tool A indexes around.

Full details of the operation and construction of the bar feeder B and bar holder C are set out in the Specification of our aforesaid U.S. Patent and only features thereof necessary to an understanding of the present invention are set out in this Specification.

Figure 5:
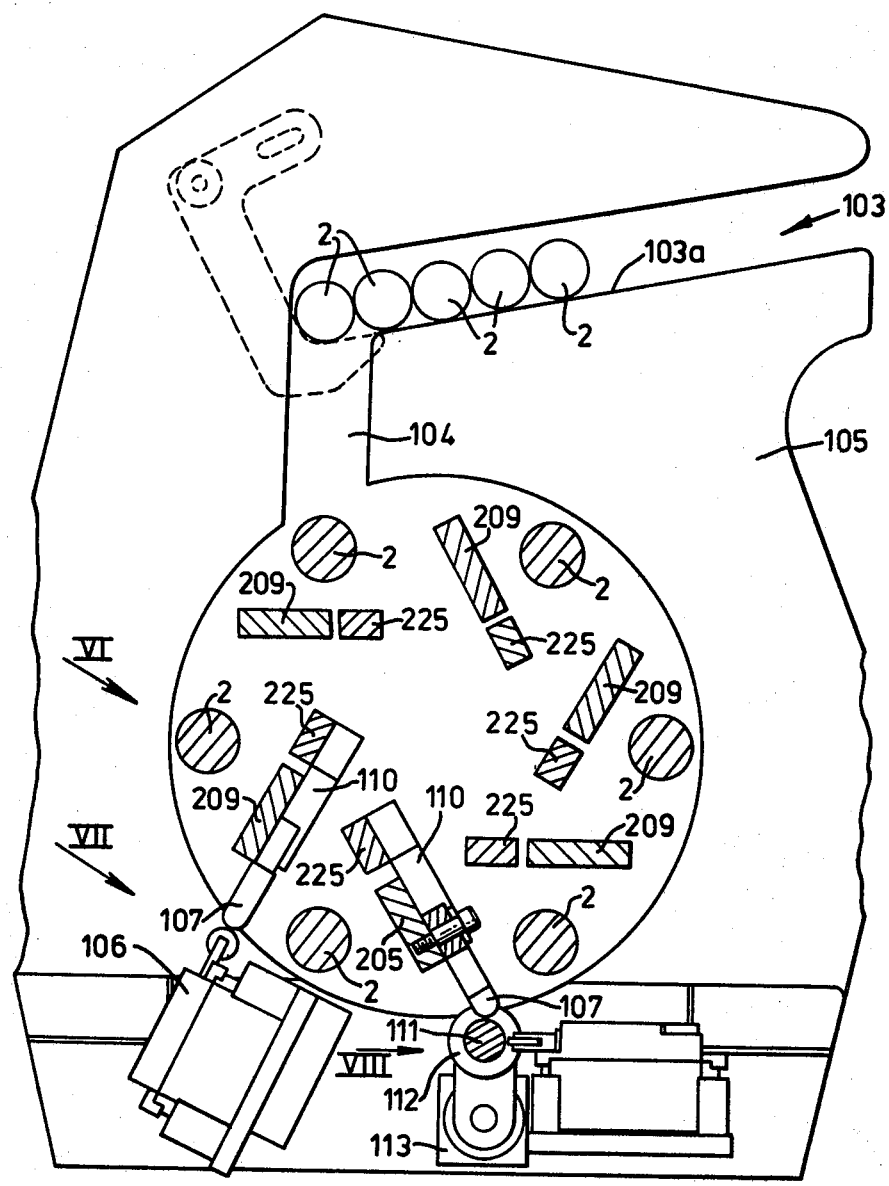
FIG. 5 is a schematic longitudinal sectional view taken on line V—V of FIG. 1 and showing the relative positions of elongate bar holders on an indexable reel of the bar holder.

Bars 2 are stored on a face 103a (FIG. 5) of the magazine 103 of the bar holder C with their front ends up against a stop face at a position indicated by the arrow 91 in FIG. 1. This is a position which is further forward i.e. further towards the lathe A, than the locations of feeder sleeves 40 of the bar feeder B when the feeder sleeves 40 are in a normal retracted position as shown in FIG. 1. A bar sensor unit 92 is provided for the bar feeder B and includes a slide block 93 having a groove 94 therein to engage a roller follower 68 of a feeder sleeve mounting 60 which is in an uppermost position. That is mounting 60 is aligned with the individual elongate bar holder of the reel of the bar holder C which has been indexed into a position to receive bar from bar loading means. The far loading means takes bar from the magazine 103 of the bar holder C and feeds it down aligned slots 104 of frame plates 105 of the bar holder into the open elongate bar holder therebeneath (FIG. 5). The bar sensor unit 92 includes a spring loaded trip finger (not shown) at a position indicated by the arrow D on FIGS. 1 and 2. The spring loaded trip finger is engaged by the bar 2 held in a bar holder as that bar holder is indexed around to the position beneath the slot 104. If the trip finger is not operated, it indicates that the tail-end of the bar held in that holder has proceeded forwardly of the position indicated by the arrow. Then, an air ram of the bar sensor unit 92 is energized and attempts to move the slide block 93 forwardly to carry the respective feeder sleeve 40 engaged therewith forwardly until the rear end of the feeder sleeve 40 is forward of the position 91, i.e. from the dotted line position of FIG. 2 to the full line position thereof. The bar holder is then opened and the bar loading means operated to load a new bar into the bar holder. With the bar held against axial movement by the bar loading means, the air ram of the bar sensor unit 92 moves the feeder sleeve 40 rearwardly to engage the feeder sleeve 40 over the front end of the new bar therein and then moves the feeder sleeve 40 forwardly to move the new bar forwardly to butt its front end against the rear end of the old bar 2b.

The rear end of the previous bar 2b may be so closely adjacent the position 91 that the air ram of the bar sensor unit 92 cannot move the slide block 93 sufficiently far forward for the rear end of the feeder sleeve 40 to be forwardly of the position 91. Thus bar gripping balls 41 of feeder sleeve 40 cannot be moved forwardly over the rear end of the old bar 2b. Consequently the bar sensor unit 92 signals the bar loading means not to open the bar holder and therefore not to effect a bar loading operation. Indexing is then continued and a bar loading operation is again attempted the next time round.

Figure 2:
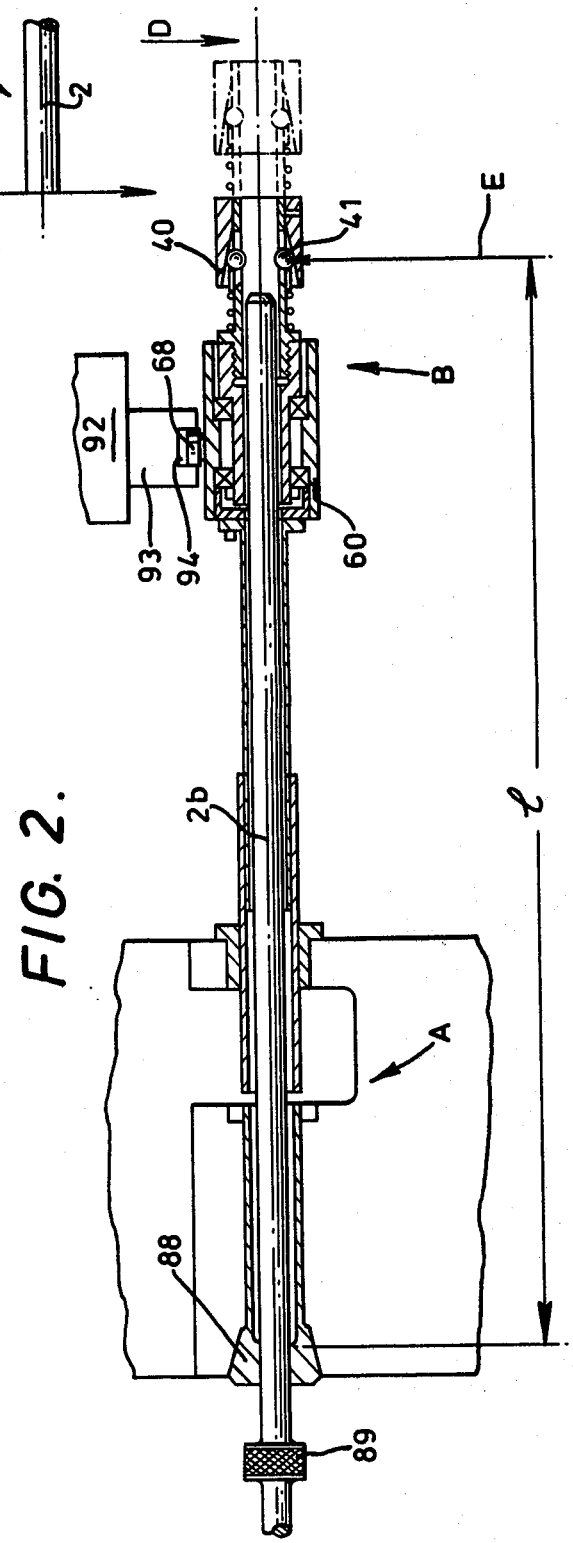
FIG. 2 is a schematic sectional view corresponding to part of the left-hand side of FIG. 1.

The position indicated by the arrow E of FIG. 2 is the position of the bar gripping balls 41 when the feeder sleeve 40 is in its forward position. The distance $l$ between position E and the rear end of the jaws of a collet 88 of the lathe A, is accurately known. The bar sensor unit 92 causes the sleeve 40 to be moved forwardly each time there is a failure to operate the spring loaded trip finger at the position of the arrow D upon indexing of the reel. Consequently, a new bar will always be dropped into the bar holder when the rear end of the old bar 2b is within one workpiece length $m$ forwardly of the position E. The length of the bar 2b extending rearwardly from the rear end of the jaws of the collet 88 is therefore always at least $l$ minus $m$ in length when the new bar is loaded into the bar holder. By dividing this length, $l$ minus $m$, by $m$, the number of workpieces which can safely be machined from the remaining length of the bar 2b can readily be calculated.

At the rear end of the bar holder C a respective electrical switch 106a-f (FIGS. 5 and 7) is provided for each of the six elongate bar holders and a respective trip is provided on that bar holder and so positioned as to engage a roller of the respective switch 106a-f and thereby cause a respective electro magnetic counter to count on one each time the bar holder passes the switch in the circular path around which it is indexed. Each of the counters can be set to a determined number and will give a signal when it has been tripped that number of times. Thus, each counter can initially be set to the number obtained by calculating $(l-m)/m$ and in operation will give its indication when the remnant of the respective bar 2b measured between the rear end of the bar and the rear end of the jaws of the collet 88 is of a length less than $m$. If the switches are positioned between the bar loading position and the position at which they are fed forwardly through the collet 88, the counter is set to $l/m$ since an initial count is obtained in this way before feeding takes place.

When an indication is received from one of the counters, an electrically controlled clutch (not shown)

through which the force for the machining operations of the machine tool A are controlled, is disengaged to prevent further machining operations when the bar holder corresponding to the counter which has given the indication is indexed into the bar feed position.

A dead-stop 89 of the machine tool is then pivoted away from the axis of the collet 88 in the bar feed position by means described hereinafter, and a piston-cylinder arrangement 87 is pressurized to cause, or vented to allow a suspended weight 82 to cause, a slide block 81 to feed the feeder sleeve mounting 60 and the associated feeder sleeve 40 forwardly to eject the remnant of the old bar 2b from the collet 88. A limit switch (not shown) provided on the piston-cylinder arrangement 87 is set so that when the slide block 81 has moved forwardly by the distance m the dead-stop 89 is swung back again into alignment with the axis of the collet 88 to press the remnant of the bar 2b, issuing from the collet 88, laterally end to provide a stop in the correct position to stop the forward movement of the front end of the new bar 2. When said limit switch on the piston-cylinder arrangement 87 is operated it also operates a delay switch. The delay set by the delay switch, for example a period of 4 seconds, allows time for the new bar to be fed up to the dead-stop 89 and upon fulfillment of the delay, the electrically controlled clutch is re-engaged and machining continues as before.

Figure 9:
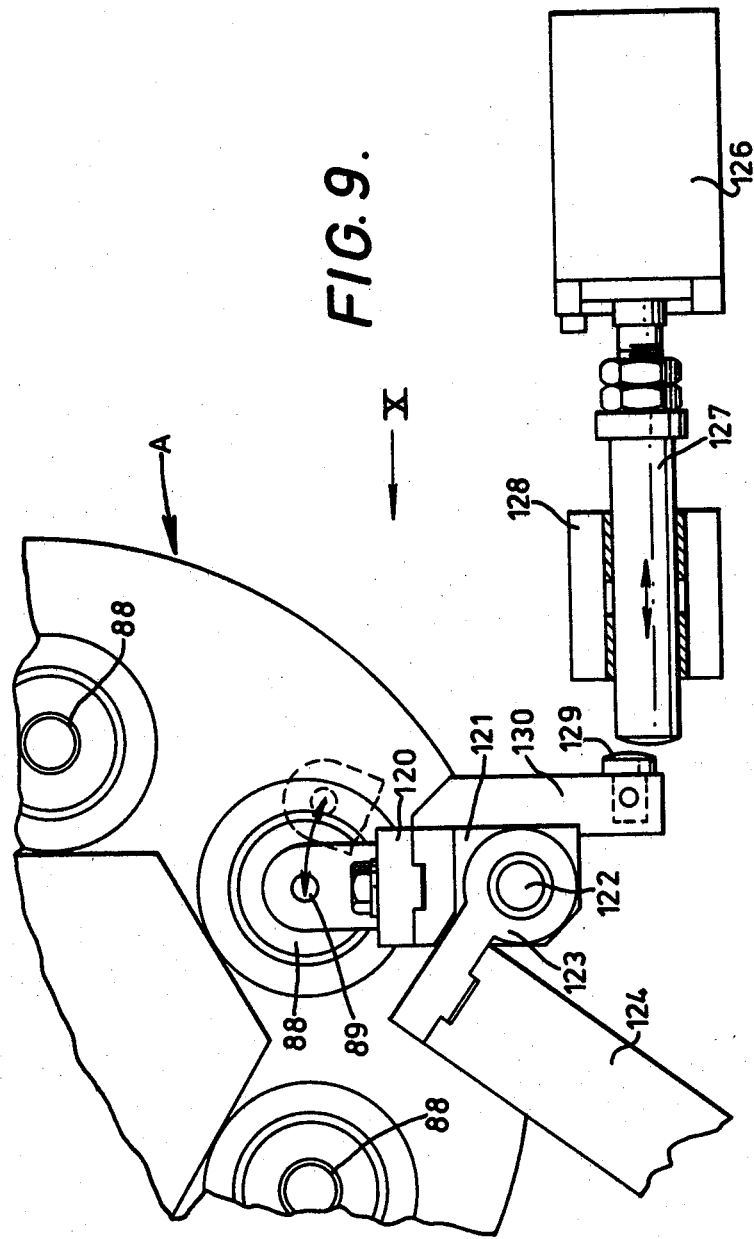
FIG. 9 is a view taken in the direction of arrow IX of FIG. 1

Referring to FIGS. 9 and 10, the dead stop 89 is provided as a set screw adjustably mounted on a bracket 120. The bracket 120 is adjustably mounted on a base member 121 which is pivotably mounted by means of a shaft 122, extending substantially parallel to the direction of bar feed, on a bifurcated member 123 adjustably mounted on a dead stop arm 124. The dead stop arm 124 is coupled to a cam shaft of the machine tool A such that when, in the machining cycle of the machine tool A, feed of bar to form a fresh workpiece is required, the arm 124 is raised to position the dead stop 89 in front of the collet 88 through which the bar is fed. The base member 121 is biased by a spring (not shown but bearing on a spring arm 125) to the position shown in FIG. 9 but can be moved away from this position to locate the bracket 120 in the position shown in dotted lines (as indicated by the doubled headed arrow), by means of an air ram 126 having a piston rod 127 supported in a bearing 128. Thus when the air ram 126 is pressurized the pistion rod 127 moves leftwardly from the position shown in FIG. 9, and bears against a pad 129 on an arm 130 of the base member 121 to pivot the bracket 120 to the dotted line position. When the bracket 120 is in the dotted line position the dead stop 89 does not obstruct movement of bar 2 out of the collet 88 and the remnant of the bar 2 can thus be ejected from the collet 88.

The exhaust of the piston-cylinder arrangement 87 is restricted during forward feed thereof to eject a remnant of bar thereby to slow down the feed compared with a normal bar feed movement.

FIGS. 3, 4 and 5 show portions of elongate bar holders of the kind described and shown in our U.S. Pat. No. 3,802,689 issued Apr. 9, 1974. Such an elongate bar holder comprises a plurality of Z-shaped levers 195, only two of which are shown, each pivoted at a respective position 196 on a fixed bar 209 and having at their ends co-operating upstanding semi-circular portions 119, 123 which in the closed position (as shown in FIG. 3) together form circular bearing bushes for the bar held in the bar holder, but which can be separated by moving an operating bar 225 longitudinally in the direction indicated by the arrow thereon. The bar 225 is coupled to the levers 195 by respective projections 224 and can be moved longitudinally by air ram powered bar opening means when the respective elongate bar holder has been indexed to the position in which it is located beneath the slot 104.

As shown in FIG. 6, the trips 107 for operating the switches 106 are mounted on the fixed bars 209 of the elongate bar holders, by bolts 108 engaged in slotted holes 109, whereby they are limitedly slidable in longitudinal directions thereon. A respective trigger 110 is provided on each of the operating bars 225 such that as each bar 225 moves in the direction of the arrow thereon to open the bar holder, the trigger 110 entrains the trip 107 on the respective bar 209 for movement therewith, but when the bar 225 and the trigger 110 effect a return movement in the opposite direction to close the bar holder, the trip 107 is left behind. Thus, when a bar holder is opened for a new bar to be loaded thereinto, the respective trip 17 is moved to a set position such that it will operate the respective switch 106 to cause the respective counter to count once every time the reel is indexed around. Each bar holder has its own respective counter, the trips 107 on the bars 209 being staggered so that each trip operates only its own switch and does not interfere with the other switches. An axially slidable shaft 111, FIGS. 5 and 8, with abutments 112 thereon and an air cylinder 113 to control sliding movement of the shaft 111 are provided in a position to act on the trip 107 of the particular bar holder which is in the indexed position at which bar feed is effected and therefore in the indexed position in which ejection of a remnant is effected.

Operation of said limit switch on the piston-cylinder arrangement 87 to depressurize the ram 126 and start the delay period of the remnant ejection cycle is also effective momentarily to pressurize the air cylinder 113 to move rightwardly, as viewed in FIG. 8, the trip 107 of the bar holder from which a remnant has just been ejected, that is to say to move it to the position at which it does not operate its respective switch 106 and also to zero that counter. Machining of the new bar then proceeds without the counter being operated until such time as the rear end of the bar proceeds past the location of the spring loaded trip finger indicated by arrow D. Movement of the operating bar 225 to open the bar holder to load a new bar thereinto then causes the respective trigger 110 to move the trip 107 leftwardly into the set position at which it operates its switch 106. When the counter has subsequently been operated a number of times equal to the number set thereon, the procedure for removing the remnant of the bar is again initiated.

By way of example:
$l = 64$ inches
$m = 5$ inches
when a new bar is loaded the rear end of the old bar is at least $l - m$, i.e. 59 inches, from the rear end of the teeth of the collet 88. Thus, $(l-m)/m$ i.e. eleven, complete workpieces can be cut from this length and the counter is therefore set to eleven. When the counter reaches eleven the lathe is stopped and the remnant of the workpiece, which extends 59-(11 × 5) i.e. 4 inches rearwardly of the rear end of the jaws of the collet 88, is fed through the collet and discarded.

If the control means of the invention are to be used on a single spindle machine, the slide block 93 and air ram of the bar sensor unit can be dispensed with and the slide block 81 used not only to feed bar through the collet 88 but also to sense the position of the rear end of the old bar.

Thus after the slide block 81 has effected each forward feed movement, the collet 88 has closed and machining has started, a further forward movement of the slide block 81 is attempted. If the rear end of the bar is sufficiently far forward to permit the slide block 81, before stalling on the rear end of the bar, to move forward in such further forward movement sufficiently far to operate a limit switch, the limit switch holds the slide block 81 in its forward position and initiates loading of a new bar into the bar holder. The limit switch is so positioned that it is operated by the slide block 81 when the rear end of the feeder sleeve 40 moves forwardly of the position 91 at which the front end of the new bar will be located when loaded into the bar holder from the magazine. The limit switch is overridden during normal forward movement of the slide block 81.

What is claimed is:

1. In combination, control means for an elongated bar holder and a bar feeder for an automatic machine tool to hold bars for and feed bars to the machine tool:
   (a) said elongated bar holder being aligned with the machine tool, which bar holder can be opened to allow bar to be loaded thereinto;
   (b) loading means to load bar into a loaded position in the bar holder;
   (c) said bar feeder being positioned between the elongated bar holder and the machine tool, through an open collet of which machine tool bar is to be fed from the bar holder;
   (d) said bar feeder comprising a sleeve engageable over a bar to be fed at a position externally of the machine tool and feed means to cause axial movement of the sleeve;
   (e) the sleeve having internal biased gripping means which permit the sleeve to be moved by the feed means over the bar in a direction away from the machine tool but prevent the sleeve being moved by the feed means over the bar in a direction towards the machine tool;
   (f) whereby a reciprocating of the sleeve by the feed means causes the bar to be fed to the machine tool; and
   (g) means to prevent movement of the bar from the loaded position in a direction away from the machine tool to enable the sleeve initially to be pressed over the end of the bar nearer the machine tool,
   (h) said control means comprising counting means settable to a determined number; trip means effective when in a set position to trip said counting means once for each workpiece machined; trigger means to move said trip means to said set position when a new length of a bar is fed into said bar holder; and means coupling said counting means to means controlling machining operation of said machine tool;
   (i) said determined number being settable so that, after a number of workpieces equal to said determined number have been machined from a length of bar preceding said new length of bar, such that the remnant of said length of bar is not of sufficient length safely to permit machining of a further workpiece therefrom, said counting means stop operation of said machine tool and cause said feed means of said bar holder and feeder to eject said remnant through said collet of said machine tool, by feeding the forward end of said new length of bar through said collet, and
   (j) means to release said trip means from said set position upon ejection of said remnant from said bar holder.

2. A bar holder and feeder coupled to an automatic machine tool as claimed in claim 1, wherein said trigger means comprise a trigger member moved by opening movement of said bar holder to allow a new bar to be loaded thereinto, said trigger member, when so moved, abutting said trip means to move said trip means into said set position.

3. A bar holder and feeder coupled to an automatic tool, as claimed in claim 1, wherein
   said releasing means comprise air ram powered cancelling means.

4. A bar holder and feeder coupled to an automatic machine tool as claimed in claim 1, further comprising means to move a dead stop on said machine tool laterally from its operating position when the remnant of an old bar is ejected through said collet, said means to move comprising a pivot mounting for said dead stop, said pivot mounting having a pivot axis extending substantially parallel to the direction of bar feed from said bar holder, an air ram energisable to pivot said dead stop about said pivot axis laterally out of said operating position, and spring means biasing said dead stop for movement about said pivot axis to said operating position.

5. A bar holder and feeder coupled to an automatic machine tool, as claimed in claim 4, further comprising a limit switch on said feed means, said limit switch being effective to de-energise said air ram when said feed means have moved forwardly by an amount equal to one workpiece length, thereby to allow said spring to restore said dead stop to its operating position to stop the front end of the new bar in the correct position for machining.

6. A bar feeder and holder coupled to an automatic machine tool, as claimed in claim 1, wherein said machine tool is an automatic multi spindle machine, a plurality of said elongate bar holders are provided one aligned with each spindle of said machine tool, and respective ones of said counting means, said trip means and said trigger means are provided for each of said elongate bar holders.

7. In combination, control means for an elongated bar holder and a bar feeder for an automatic machine tool to hold bars for and feed bars to the machine tool:
   (a) said elongated bar holder being aligned with the machine tool, which bar holder can be opened to allow bar to be loaded thereinto;
   (b) loading means to load bar into a loaded position in the bar holder;
   (c) said bar feeder being positioned between the elongated bar holder and the machine tool, through an open collet of which machine tool bar is to be fed from the bar holder;
   (d) said bar feeder comprising a sleeve engageable over a bar to be fed at a position externally of the machine tool and feed means to cause axial movement of the sleeve;
   (e) the sleeve having internal biased gripping means which permit the sleeve to be moved by the feed means over the bar in a direction away from the machine tool but prevent the sleeve being moved by the feed means over the bar in a direction towards the machine tool;

(f) whereby a reciprocation of the sleeve by the feed means causes the bar to be fed to the machine tool; and (g) means to move the bar towards the machine tool initially to engage the end of the bar nearer the machine tool in the sleeve, (h) said control means comprising counting means settable to a determined number; trip means effective when in a set position to trip said counting means once for each workpiece machined; trigger means to move said trip means to said set position when a new length of bar is fed into said bar holder; and means coupling said counting means to means controlling machining operation of said machine tool;

(i) said determined number being settable so that, after a number of workpieces equal to said determined number have been machined from a length of bar preceding said new length of bar, such that the remnant of said length of bar is not of sufficient length safely to permit machining of a further workpiece therefrom, said counting means stop operation of said machine tool and cause said feed means of said bar holder and feeder to eject said remnant through said collet of said machine tool, by feeding the forward end of said new length of bar through said collet, and (j) means to release said trip means from said set position upon ejection of said remnant from said bar holder.

8. In combination, control means for an elongated bar holder and a bar feeder for an automatic machine tool to hold bars for and feed bars to the machine tool:

(a) said elongated bar holder being aligned with the machine tool, which bar holder can be opened to allow bar to be loaded thereinto;

(b) loading means to load bar into a loaded position in the bar holder;

(c) said bar feeder being positioned between the elongated bar holder and the machine tool, through an open collet of which machine tool bar is to be fed from the bar holder;

(d) said bar feeder comprising a sleeve engageable over a bar to be fed at a position externally of the machine tool and feed means to cause axial movement of the sleeve;

(e) the sleeve having internal biased gripping means which permit the sleeve to be moved by the feed means over the bar in a direction away from the machine tool but prevent the sleeve being moved by the feed means over the bar in a direction towards the machine tool;

(f) whereby a reciprocation of the sleeve by the feed means causes the bar to be fed to the machine tool; and (g) means to move the bar towards the machine tool initially to engage the end of the bar nearer the machine tool in the sleeve, (h) said control means comprising counting means settable to a determined number; trip means effective when in a set condition to trip said counting means once for each workpiece machined; trigger means to set said trip means to said set condition when a new length of bar is fed into said bar holder; and means coupling said counting means to means controlling machining operation of said machine tool;

(i) said determined number being settable so that, after a number of workpieces equal to said determined number have been machined from a length of bar preceding said new length of bar, such that the remnant of said length of bar is not of sufficient length safely to permit machining of a further workpece therefrom, said counting means stop operation of said machine tool and cause said feed means of said bar holder and feeder to eject said remnant through said collet of said machine tool, by feeding the forward end of said new length of bar through said collet, and (j) means for releasing said set condition of said trip means upon ejection of said remnant from said bar holder.

* * * * *

UNITED STATES PATENT OFFICE
CERTIFICATE OF CORRECTION

Patent No. 4,088,230          Dated May 9, 1978

Inventor(s) Ewart H. Doe and William J. Linforth

It is certified that error appears in the above-identified patent and that said Letters Patent are hereby corrected as shown below:

On Page 1, at [73] delete "Twyford Moors (Aircraft & Engineering) Ltd., England and insert therefor --Hagenuk Vormals Neufeldt and Kihnke G.m.b.H. Germany--.

Signed and Sealed this

Second Day of January 1979

[SEAL]

Attest:

RUTH C. MASON
*Attesting Officer*

DONALD W. BANNER
*Commissioner of Patents and Trademarks*

UNITED STATES PATENT OFFICE
CERTIFICATE OF CORRECTION

Patent No. 4,088,230          Dated May 9, 1978

Inventor(s) Ewart H. Doe and William J. Linforth

It is certified that error appears in the above-identified patent and that said Letters Patent are hereby corrected as shown below:

On Page 1, at [73] delete "Twyford Moors (Aircraft & Engineering) Ltd., England and insert therefor --Hagenuk Vormals Neufeldt and Kuhnke GmbH. Federal Republic of Germany--

This certificate supersedes Certificate of Correction issued January 2, 1979.

Signed and Sealed this

Fifteenth Day of May 1979

[SEAL]

Attest:

RUTH C. MASON
*Attesting Officer*

DONALD W. BANNER
*Commissioner of Patents and Trademarks*